Jan. 26, 1926.  
W. C. WRIGHT ET AL  
1,570,693  
LEATHER TEMPERING MACHINE  
Filed Jan. 7, 1921  5 Sheets-Sheet 1
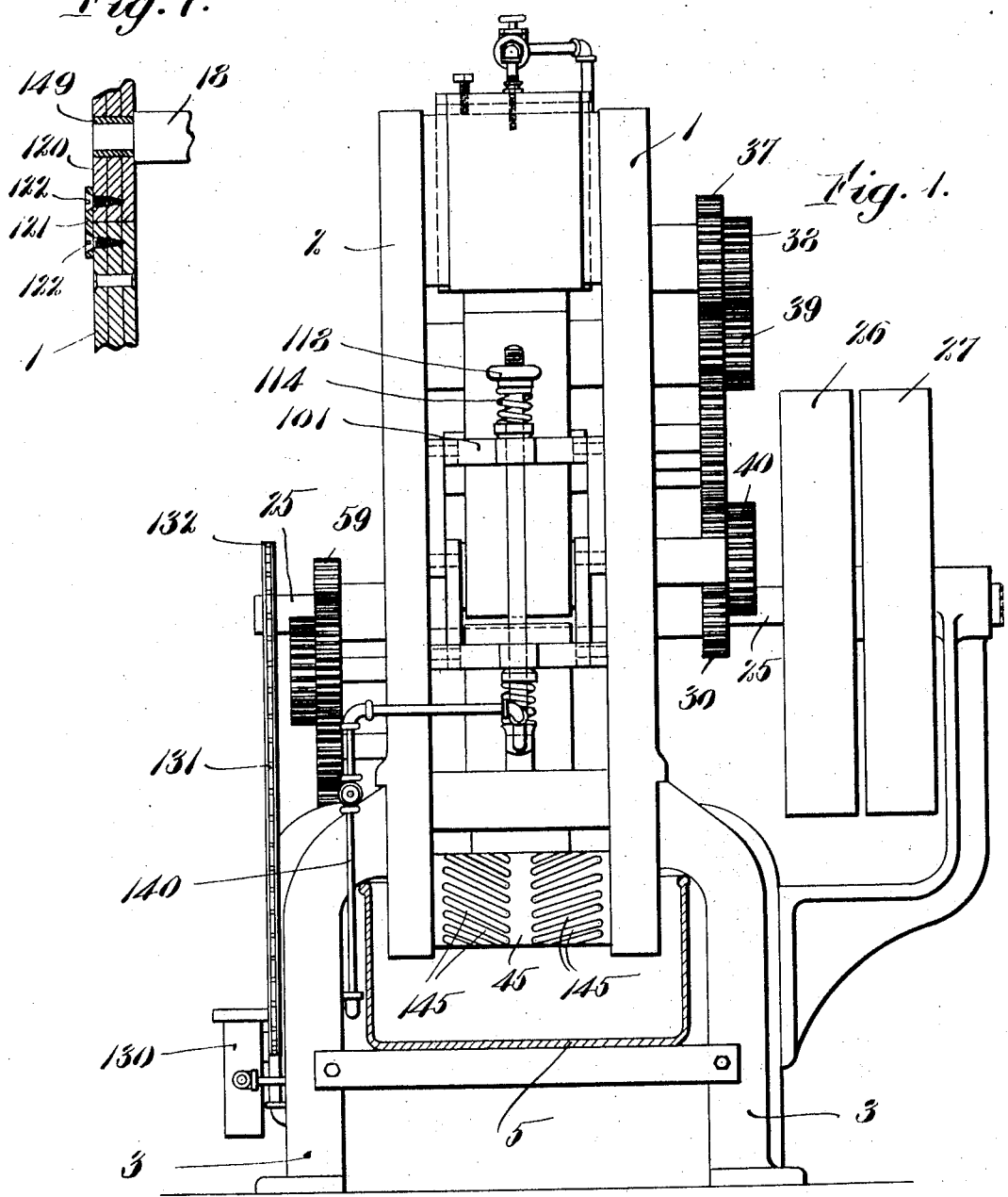
Inventor:  
Wallace C. Wright  
Frank W. Merrick  
by James K. Hodder  
att'y.

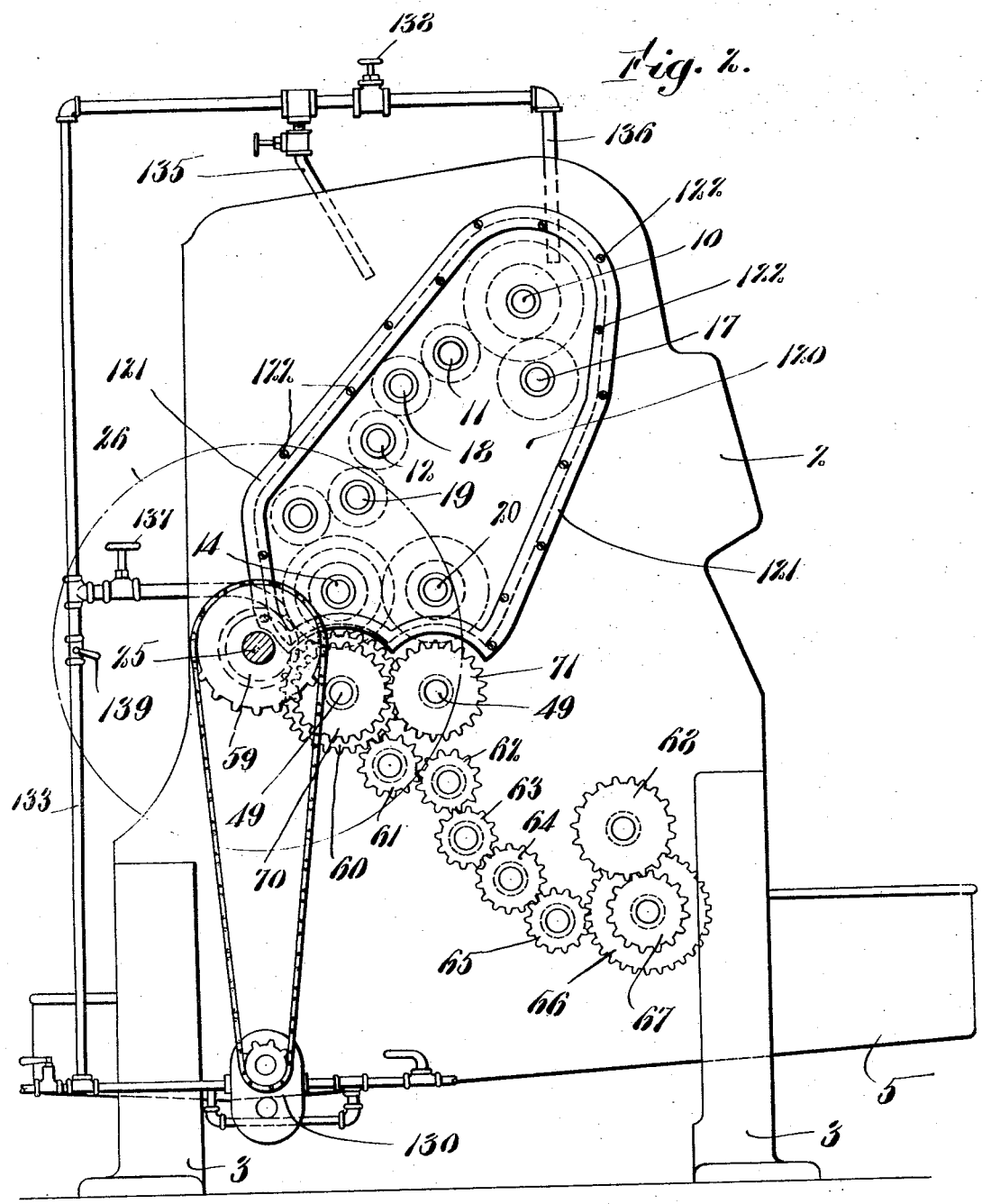

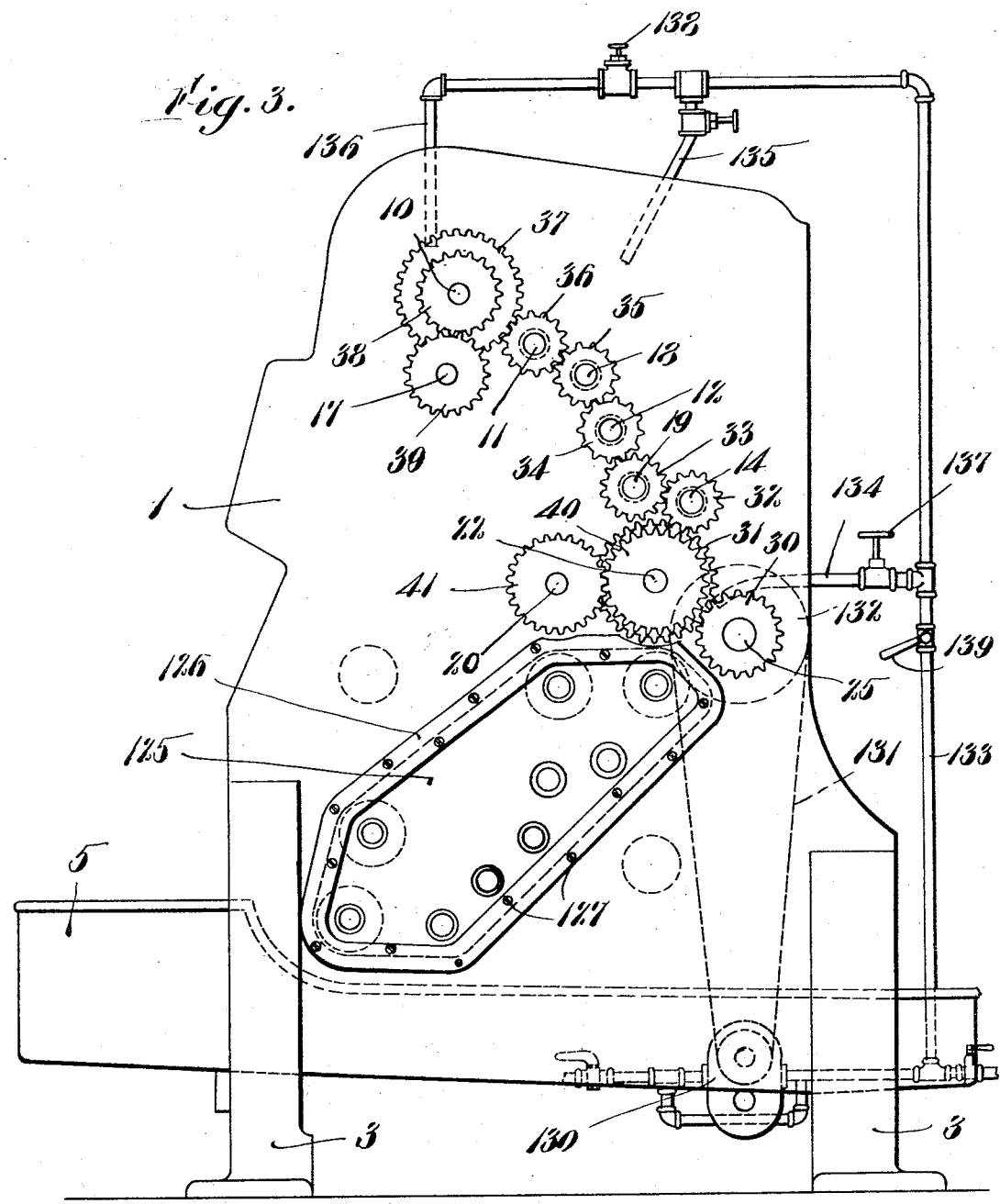

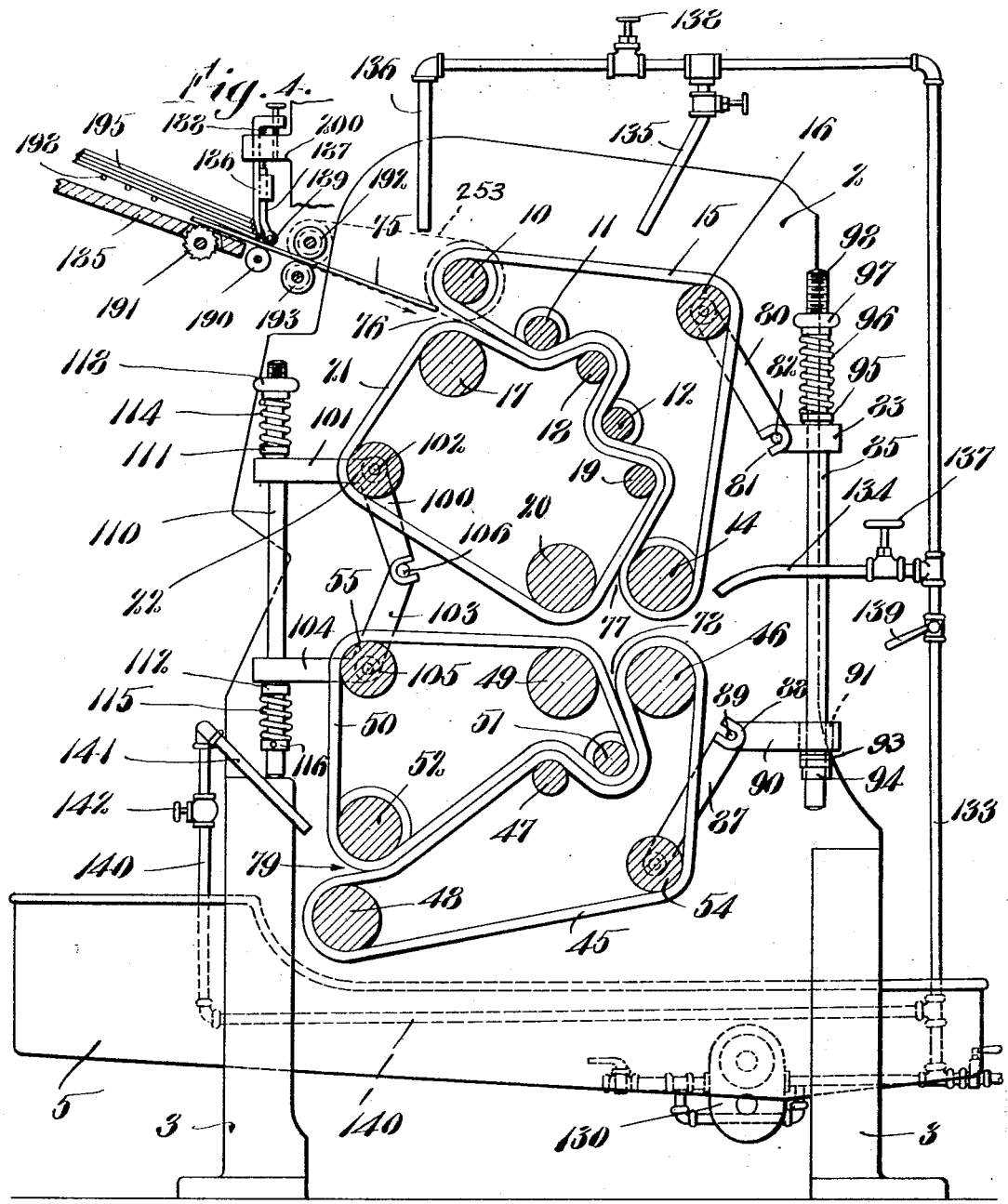

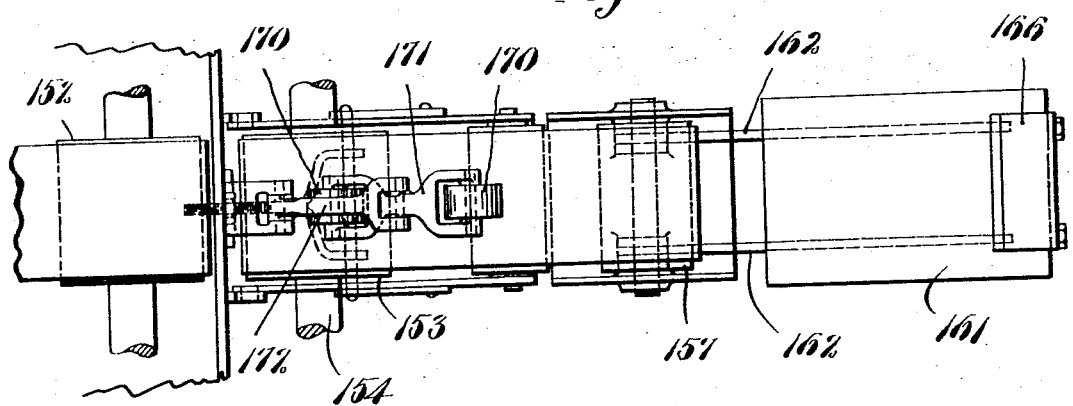
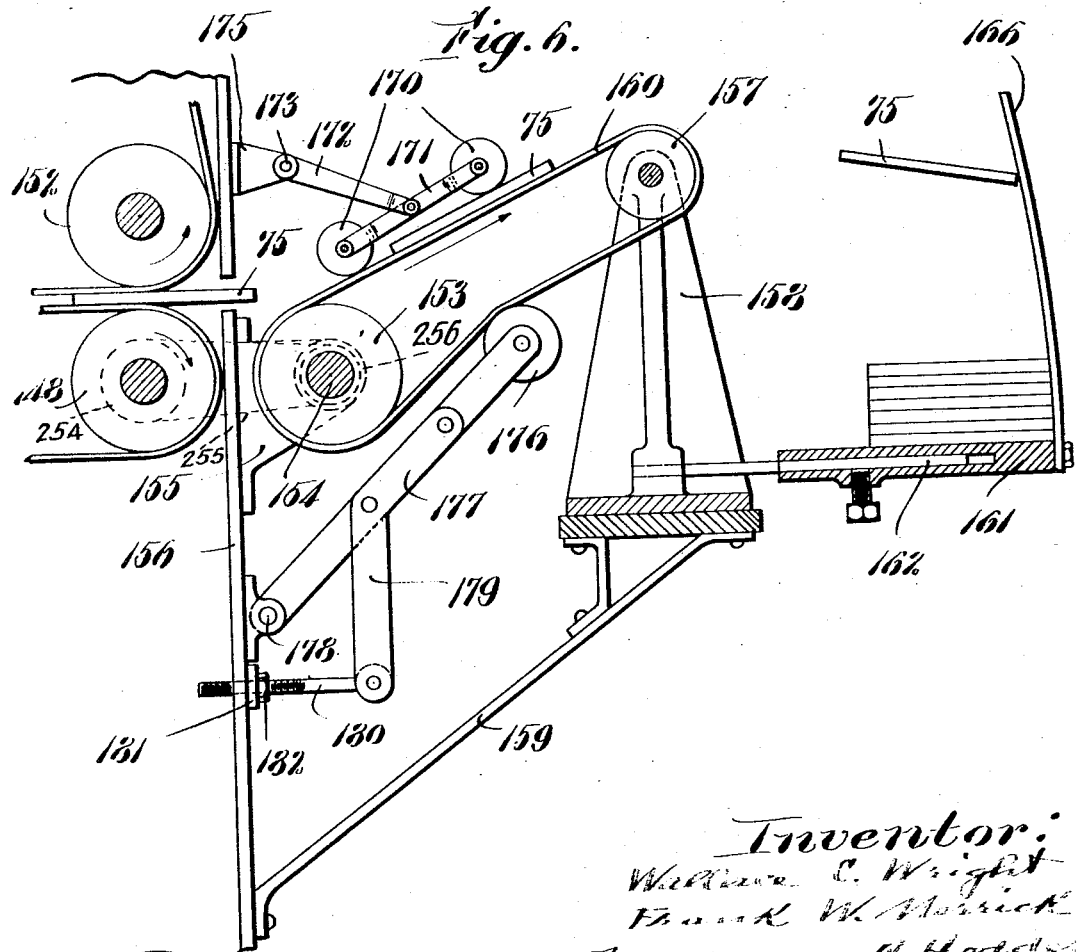

Patented Jan. 26, 1926.

1,570,693

UNITED STATES PATENT OFFICE.

WALLACE C. WRIGHT, OF BROOKFIELD, NEW HAMPSHIRE, AND FRANK W. MERRICK, OF BOSTON, MASSACHUSETTS, ASSIGNORS TO AMERICAN SHOE MACHINERY COMPANY, OF BOSTON, MASSACHUSETTS, A CORPORATION OF MASSACHUSETTS.

LEATHER-TEMPERING MACHINE.

Application filed January 7, 1921. Serial No. 435,733.

*To all whom it may concern:*

Be it known that we, WALLACE C. WRIGHT, a citizen of the United States, and resident of Brookfield, in the county of Carroll and State of New Hampshire, and FRANK W. MERRICK, a citizen of the United States, and resident of Boston, in the county of Suffolk and State of Massachusetts, have invented an Improvement in Leather-Tempering Machines, of which the following description, in connection with the accompanying drawings, is a specification, like letters on the drawings representing like parts.

Our present invention is an improved machine for operating upon leather to render the same flexible and to apply a tempering solution thereto. Machines of this general class are illustrated by U. S. Patent No. 1,175,680, issued March 14, 1916, and the object of the present invention is to improve and perfect machines of that type.

Further objects of the invention are to provide a machine which will be economical to build, preferably employing wood for the framework and which machine will also enable rapid construction in quantities, ease and speed of forming the bearings for the rollers, shafts, etc., and which will also facilitate the assembling of the machine parts, the operating belts, and give accessibility thereto.

An important object of the present invention, also, is to provide a machine with a conveying system, which system will automatically separate and feed material to the machine, preferably in longitudinal progression, conveying the same entirely through the various instrumentalities operating on the material in the machine, while carrying the same forward and finally delivering the material in a desired and predetermined laminated position. In order to accomplish this result the conveying system utilizes a plurality of different means, a part of the conveyor system comprising one moving means, preferably operating at a speed suitable to and necessary for the separating and feeding action; a second conveying means as a part of the conveyor system adapted to carry the material through the tempering and flexing portions of the machine and preferably to operate upon the work as a part of the flexing and tempering devices; and a third means to separate the material longitudinally and bunch it in laminated groups. The part of the conveying system which is within the machine itself must run at a different speed, in order to be efficient in the flexing and tempering operation, than that of the feeding part of the conveyor system. Furthermore, this portion of the conveying means within the machine can be of a plurality of sections or otherwise, such for example as the several pluralities of conveying devices shown in Figs. 6 and 7 of said prior patent. The final portion of the conveying means, i. e., the delivery part, should run at a speed for its efficient operation and which will usually be considerably different from either of the other speeds in the conveying system, while all operate continuously upon the work. Thus the feeding in conveying portion may operate to give an oversupply of material; the conveyors in the machine may operate to temper and flex as great a number of blanks or material as the capacity of the machine will take; and the delivery mechanism will operate at a greater speed to separate, space and stack up the blanks, all operating at their respective greatest degree of efficiency.

In machines for treating leather to render the same flexible, and particularly for operating upon soles for use in the manufacture of boots and shoes, of the type illustrated by said prior patent, it is desirable to provide mechanism including a considerable number of rollers, adapted to carry a plurality of belts, and to apply tempering liquid to the work as it passes through the machine. It is, therefore, necessary to have apparatus that will be capable of withstanding to a considerable degree the liquid applying devices, the leather or sole feeding devices, and to keep the same while operating upon successive leather blanks, under a proper degree of tension and supplied with a desirable quantity of moisture. Owing to the tempering liquid which it is usually desirable to employ, considerable difficulty has been heretofore experienced in making the machine framework and rollers of metal which would resist corrosion and the oxidizing effect of the tempering liquid. In order to confine the tempering liquid, which was supplied at a plurality of points and in considerable quantities, and to utilize the liquid to the greatest possible efficiency, it is necessary to have the work conveying and flexing instrumentalities enclosed. Furthermore with the alternating moisture applying and drying resulting from a day's use and then the machine standing idle through the night, or when not in use, the ordinary iron or metal, whether galvanized, brass coated or the like, was incapable of standing up to the requirements for such a tempering machine. It was most important that no rust or the like be permitted to form on the interior of the machine frame, casing, enclosing and wheels or belts, as such would mar, damage and discolor the leather being treated. Consequently the usual iron or galvanized iron construction was unsuited for this class of machine and solid brass or copper was entirely too expensive and of undue weight to secure proper strength.

In the machine of our present invention we have obviated the difficulties above noted and have provided, a frame of wood which is preferably formed with a plurality of layers or thicknesses to give increased strength, afford a suitable thickness for the bearings for the numerous roller axles necessary, and which is of great economy in construction, assembling and repair, as well as economical in cost of transportation, being of relatively light weight. A further advantage of this wooden construction consists in the fact that the inner layer of the wood, which is in contact with the tempering liquid during use of machines of this type, when coated with any usual or suitable waterproofing, such as tar, copper paint, or the like, is rendered impervious to damage from the tempering solution and involves but slight expense in such treatment. Furthermore the use of wood and preferably of a plurality of layers of the same, tends to decrease vibration in the operation of the machine and therfore is of very decided advantage when the machine is installed in the upper floors of buildings. In manufacturing machines with the wooden frames the large number of bearings for the shafts can be readily and quickly bored, a dozen side frames being capable of undergoing the boring operation simultaneously, and of course much quicker and easier than when treating iron castings.

Further important features of our present invention consist in the provison of novel and efficient means for equalizing the tension on the plurality of belts employed, for securing adjustment of said tension on the belts simultaneously, by simplicity of construction of the same, accessibility for adjustment, and also being out of the way of the work and free of tempering liquid.

A further feature consists in an improved form of delivery for the blanks as they are fed through the machine, insuring their prompt removal and by means which will automatically take care of the varying thicknesses in the successive layers of leather usually operated upon.

Further details of construction, novel combinations of parts and advantages will be hereinafter more fully pointed out and claimed.

Referring to the drawings, illustrating a preferred embodiment of our invention, Fig. 1 is a rear elevational view;

Fig. 2 is a side view looking from the left of the machine as shown in Fig. 1;

Fig. 3 is an opposite side view looking from the right of Fig. 1, with the driving pulleys removed;

Fig. 4 is a longitudinal vertical cross-sectional view;

Figs. 5 and 6 are respectively plan and side views, the latter partly in cross-section, of the improved delivery mechanism; and Fig. 7 is a fragmentary view in detail of a bearing through the wooden frame and method of uniting the detachable sections to facilitate removal and replacement of the belts.

Referring to the drawings wherein we illustrate our invention in preferred form, the main portions of the machine comprise the wooden sides 1 and 2 of suitable height for carrying the plurality of rollers, feeding belts, etc., and supported on legs 3, 3, 3, to afford a desirable height for the machine and to permit a liquid receiving and collecting reservoir or tank 5 to be fitted underneath the working parts and preferably above the floor.

These wooden sides are preferably formed of a plurality of layers, arranged in alternate or different directions with regard to the grain of the several layers of wood comprising each side, three such layers being suitable and cypress being a species of wood which has been found satisfactory, as this wood varies but slightly during alternate wetting and drying. These wooden sides are bolted together at a plurality of points or otherwise secured and constitute the framework for the rollers, belts, etc., and also an enclosure for the same and for the liquid supplied to the leather as it is fed through the machine. These wooden sides with such plurality of layers afford a very strong, sturdy and non-vibrating supporting framework for the machine, give a suitable length for the bearings for the rolls, and facilitate the speed of building and assembling.

In our present machine we have adopted the general arrangement of conveying rollers and belts illustrated in said prior Patent No. 1,175,680, and shown more specifically in the patent to Wright, Grover & Young, No. 1,482,063, granted January 29, 1924, and have also utilized herein the general form of automatic feeding mechanism shown and described in our prior and copending application Ser. No. 434,756, filed January 3, 1921. While we have also utilized the general form of the automatic delivery mechanism of Patent No. 1,448,173, granted March 13, 1923, to Wallace C. Wright, we have considerably improved the delivery mechanism thereof in the present machine.

Each of the sides 1 and 2 has drilled therethrough at appropriate places, bearing recesses to receive a bushing, in which the reduced end of one of the rollers is fitted. These rollers are arranged in staggered relation, and in position to carry two belts in contact with certain of the rollers in the upper part of the frame and corresponding double line of belts in the lower portion. These rollers and their shafts are indicated in substantially desired position at 10, 11, 12 and 14, arranged on the inside of the belt 15 in the upper portion, the idle roller and belt tightening guide or pulley 16 being spaced from and positioned triangularly with regard to the other rollers. The cooperating upper belt 21 is led around the rollers 17, 18, 19 and 20, together with a belt tightening idler 22. These belts are in continuous rotation, being actuated by a chain of gears arranged outside of the side frame 1, as clearly illustrated in Figs. 1 and 3. These gears receive power from a shaft 25 carrying a keyed and loose pulley 26 and 27 respectively and the gear wheels 30, 31, 32, 33, 34, 35, 36, 37, 38, 39, 40 and 41, these gears being keyed to their respective shafts as shown in Fig. 3.

The lower pair of belts 45 and 50 are led around the pulleys 46, 47, 48 and 49, 51 and 52, as shown in Fig. 4. The belt 45 is also engaged by a belt tightener 54 and the belt 50 by the roller and belt tightener 55. This lower series of rollers have their shafts extending at one side and outwardly through the wooden framework 2 where a chain of gears rotates them, the power shaft 25 having suitable journal bearings in both the side frames 1 and 2, extending outwardly as indicated in Fig. 1. The pinion 59 on this outer end of the shaft 25 meshes with a chain of gears keyed upon the shafts of the rollers for the lower set of belts, to positively rotate the same, as shown in Fig. 2 at 60, 61, 62, 63, 64, 65, 66, 67 and 68 in the sequence named and gears 70 and 71 for the shafts 46 and 49. The arrangement of gears just described tends to rotate, positively, and at desired speed, the two sets of belts 15 and 21 in the upper portion and 45 and 50 in the lower portion of the machine. These belts act to engage the blank 75 as it is fed into the throat 76 of the upper belts, gripping the end portion of the blank and feeding it forwardly while undulating the same in a sinuous path around the various rollers and also while held under the tension of the belts during this alternate flexing, bending or undulating movement. The blank is then forced out of the upper set of belts at 77 and is fed by gravity and its continuous travel into the throat 78 of the lower set of belts, from whence it is delivered at 79 to the delivery mechanism, illustrated diagrammatically in Fig. 6.

In order to secure the desired tension on the four belts, i. e., two pairs, we have provided novel belt tightening devices. As best shown in Fig. 4, the rollers 16 and 54 constituting the idlers and belt tightening pulleys about which the belts 15 and 45 respectively are led, are arranged for simultaneous and equalized tension and adjustment. The roller 16 is mounted on the forked arm 80 of a rockshaft 81, which is pivoted on 82 to the side frames 1 and 2. The other arm 83 of the rockshaft extends rearwardly and is recessed to receive a rod 85. The lower pulley 54 is carried on a similar forked arm 87, being part of a rockshaft 88 mounted on a pin 89 and with its other arm 90 also perforated as indicated in dotted lines at 91, of slightly greater diameter than the said rod 85, to allow for a rocker movement. The lower part of the rod 85 carries a conical washer 93 held in place by a lock nut 94 threaded onto said shaft 85 and constituting a bearing with an upward thrust on the arm 90. A similar conical washer 95 is fitted around the shaft 85 adjacent the arm 83. On this washer a coiled spring 96 bears, being adjusted in its tension by a rotatable thumb nut 97 threaded onto the upper part 98 of the shaft 85. Manipulation of the thumb nut 97 thus serves to exert a cooperating and equalizing tension upon the arms 83 and 90 respectively of the rock shafts which actuate the tension pulleys 16 and 54 for the belts 15 and 45. In this manner an equal tension is applied to both belts and utilizing the belts themselves as the counter-thrust for the single tensioning spring 96. We believe that this provision of a double tensioning device for separate belts or the like and by a single rod with adjustable tensioning means thereon, is distinctly new, and we wish to claim the same herein broadly.

A somewhat similar arrangement is provided for the supporting and tensioning of the rolls 22 and 55 for the belts 21 and 50 respectively. In this arrangement at the front of the machine, we have provided a pair of rock shaft arms 100 and 101, between which the roller 22 is pivotally mounted on the shaft 102. Similar rock arms 103 and 104 with a shaft 105 for the roller 55 is provided. The two rock arms 100 and 103 are pivotally supported on a rod 106 extending widthwise of the machine and supported in the frames 1 and 2. This common support affords means to attach both rock arms at a rigid point and gives the rollers 22 and 55 the desired freedom of movement in the tensioning adjustments now to be described. The arms 101 and 104 respectively are perforated to receive a rod 110. Preferably the recesses through the arms 101 and 104 are of slightly greater diameter than that of the rod 110. Conical washers 111 and 112 are fitted on top and bottom respectively of the arms 101 and 104, against which the tension of coiled springs 114 and 115 respectively is applied. The spring 115 may bear against a collar 116 rigidly secured to the rod 110 and the other spring 114 bears against an adjustable thumb nut 118 threaded on the fixed part of the rod 110. Consequently adjustment of the thumb nut 118 automatically and equally adjusts the tension of both the springs 114 and 115 and thereby simultaneously adjusts the tension of the idlers 22 and 55 holding the bolts 21 and 50 respectively.

It will be noted that the belts can thus be instantly adjusted in any tension desired and during the continuous operation of the machine. Therefore if it is found that a greater flexing tension is requisite for certain grade or bunch of leather, soles or the like to be run through the machine, either or all of the belts, or of the pairs of belts can be regulated to secure the best results on the particular work in hand.

In order to facilitate the fitting, as well as the removal and renewal of the belts, we provide sections of the side frames for removal. By removing an entire section of the frame having all the fixed bearings for the rollers of one pair of belts, releasing the tension of the belt tightening idlers and slipping off the belts sideways, a new belt can be readily supplied. The thickness of the framework and the weight and strength of the gearing at one side serves to hold the rollers in alinement during the removal of one section, opposite to that on which the gears are applied, thus holding all the rollers extended and ready for removal of an old belt or application of a new one. For this purpose we arrange the gears actuating the rollers and belts for the upper pair at one side of the frame 1 and the removable section at an opposite side of the frame 2, reversing this arrangement for the lower set of belts, by having the set of gears on the shafts immediately outside the frame 2 and the removable section for this set of rollers in the frame 1.

As shown in Fig. 2, the removable section for the upper set is designated at 120 and a metal plate 121 of similar contour to that of the section 120 cut out of the framework 2 is provided and of sufficient width to overlap both the marginal part of the section 120 and the adjacent marginal portion of the side frame 2, a suitable number of screws 122, 122, being alternately applied through the plate 121 into the section 120 and the framework 2 to hold them in assembled position. Once in position the section is strong and rigid, fitting snugly in the framework and strengthening the same as well as taking up the strains and thrusts afforded by the rollers in proper alinement with the entire frame 2. A similar construction is arranged for the lower set, wherein the section 125, is illustrated, as shown in Fig. 3, carrying the several bearings for the lower set of rollers. A similar plate 126 is utilized with a plurality of screws alternately set into the section and into the framework 1.

In order to supply tempering fluid in desired quantities and to conserve the same, as well as maintain a tank of substantial size, from which the supply is taken, the tank 5 is positioned as already described. In this tank a pump 130 is fitted, being actuated by a sprocket chain 131 around a pulley 132 keyed on the outer end of the main power shaft 25. This pump takes the liquid from the tank 5 and forces the same upwardly through the conduit 133 at the back of the machine. In order to supply tempering fluid at a plurality of points, branch pipes 134, 135, and 136 are provided, suitable shut-off valves 137, 138 and 139 being fitted substantially as illustrated in Figs. 3 and 4. An important feature in our present machine is the fact that we supply tempering liquid to both sides of the belts, which convey and undulate the blanks through the machine. Heretofore it has been considered desirable to supply the tempering liquid mainly on the blank itself at the throat where the same enters the conveying system of the belts, but we find it desirable to also supply directly to the conveying belts sufficient tempering solution to form a thin film thereon. The lowermost belts, owing to their position and the action of gravity on the solution, are usually amply supplied with moisture, but we have fitted an extra branch pipe 135 so that it may if desired feed solution directly onto the belt 15 before it engages a blank 75. By means of the various valves the supply of liquid, as well as the points at which it is supplied, can be readily controlled. We also fit an extra branch conduit 140 with a nozzle 141, and valve 142, controlling the supply of same, directing this nozzle at the delivery end of the machine as the blank comes out of the belts at 79, since it is sometimes desirable to have the leather with an oversupply of tempering liquid.

We may and preferably do utilize the type of belts shown and described in the patent granted to Messrs. Wright, Young & Grover, No. 1,370,392 and dated March 1, 1921, the same being illustrated in Fig. 1, wherein the lower belt 45 appears with the liquid carrying recesses 145 therein. We have also illustrated at Fig. 7 a typical roller 18 and bushing 149 fitted in the wooden side frames, extending through the plurality of layers and constituting the bearing for the shafts of the rollers.

Referring to Figs. 5 and 6 wherein we have illustrated our improved delivery mechanism, preferably employed as a portion of the present machine and to complete the automatic delivery and separation of the blanks, we have illustrated the same herein somewhat in diagrammatic form, as applicable to the present machine or where similar work is desired. We have, therefore, designated at Figs. 5 and 6 the rolls 152 and 148 corresponding with the rolls 52 and 48, in the machine, wherein the belts deliver the blank 75 from the machine. The delivery mechanism comprises a roll 153 mounted on an axle 154 secured to brackets indicated in dotted lines at 155 on portions 156 of the frame of the machine, immediately in advance of the last rolls, around which a belt 160 is led extending upwardly to a second roll 157 mounted on arms 158, secured to brackets 159 also attached to the frame 156. This belt conveyor 160 may be of any suitable length and at substantially any desired angle to lift the blank 75 upwardly if the delivery end of the machine is close to the floor. The blank receiving mechanism comprises a plate 161 attached (adjustably) to a pair of rods 162, 162, extending from the arms 158 and having an inclined guide plate 166 to act as a stop for the blanks 75 as they are "snapped off" the belt 160, these being separated end for end by the increased speed of the delivery conveyor and piled in stacked relation, in a manner similar to that illustrated and described in said Patent No. 1,448,173. We find that where there is a considerable angle to the belt 160 in order to bring the blanks upwardly to a convenient height for the operator and to secure ample room for stacking the same, that the blanks will tend to slip upon the belt 160, particularly after the machine has been running some time and considerable moisture is covering the belt 160. Therefore we have applied a device to insure that the blanks will be positively carried by the belt 160, to also insure the desired spacing of these blanks to permit the separation and stacking of the same. It will be appreciated that when the machine is running to capacity, the blanks are fed in substantially in abutting relation, end to end, and it is difficult, if not impractical, to separate them in the machine, but the delivery belt 160, which is preferably run at a higher speed, seizes a blank from the delivery rolls and feeds it forward a substantial distance before the succeeding blank is released by the last pair of feeding rolls of the machine. To insure the desired operation of this delivery mechanism, therefore, we provide automatic means to aid in gripping the blanks, irrespective of their thickness, and cooperate with the feeding belt 160. Preferably this device comprises a pair of rollers 170, mounting the same upon a rockshaft 171 which in turn is pivotally attached to a link 172 secured at 173 by a pin to a bracket 175 attached to the frame of the machine. The weight of the rollers 170 and attached rockshaft and link are sufficient to insure the desired gripping of the blank 75 onto the delivery belt 160, and preserve the spacing desired and the lifting of the blanks, as well as to insure their separation, "shooting" the same off the belt against the plate 166 and thus insuring their separation and stacking.

Any suitable belt tightener can be utilized on the delivery belt 160, but as herein shown we apply a roll 176 mounted on an arm 177 which in turn is pivoted at 178 to the frame of the machine and is adjusted in its tension by a strut 179, which is pivotally secured to a threaded rod 180, the latter passing through a tapped bearing 181 on the frame of the machine and held in adjusted position by the lock nut 182.

In Fig. 4 we have illustrated in fragmentary view a portion of the automatic feeding apparatus which is employed to feed in the blanks 75 and which, preferably, is similar to the construction illustrated in our said prior application, Ser. No. 434,756, filed January 3, 1921, reference thereto being hereby made for a further detailed illustration and description. This feeding device comprises the platform 185, preferably inclined and the adjustable gates 186 and 187, the latter adapted to slide on the adjustable gate 186 and having a spring 188 to force the slide 187 and its roller 189 downwardly cooperating with an idler 190 underneath the same. A positive rotating feeding member 191 is provided, operated from any suitable source of power, and a pair of feed rolls 192 and 193 can be supplied or the feeding apparatus may be sufficiently close to the throat 76 of the first pair of belts so that the blank 75 may be fed directly thereto and gripped thereby. The stack of blanks 195 is preferably supported on an antifriction roll 198 in a manner similar to that described and explained in said prior application. This feeding device can be affixed to the frame of the machine in any suitable manner, a fragmentary bracket 200 being illustrated, which would be attached to the frame brace.

The feeding rolls 192 and 193 are driven at a greater surface speed than the speed of the belts 15 and 21 by means of a pulley 251 secured on the end of the shaft on which is formed the roller 10 and over which runs a belt 252, this belt also running over a pulley 253 secured on the end of the shaft on which is secured the roller 193. The delivery belt 160 is driven at a greater speed than the belts 45 and 50 by means of a pulley 254 secured to the shaft on which is formed the roller 48 and over this pulley runs a belt 255. This belt also runs over a pulley 256 that is secured to the end of the shaft on which is formed the roller 154. From an inspection of Fig. 4, it will be obvious that the pulley 253, being smaller than the pulley 251, the rolls 192 and 193 will rotate at a surface speed greater than the surface speed of the belt 15 and, also, from an inspection of Fig. 6, it will be obvious that the pulley 256, being smaller in diameter than the belt 254, the surface speed of the roll 153 and, therefore, the belt 160, will be greater than the surface speed of the belts 45 and 50.

The operation of our improved machine will be readily understood from the foregoing description and the drawings. Tempering solution being supplied to the tank 5 and power to the fixed pulley on the shaft 25, the belts will be actuated and the pump 130 operated to supply liquid under pressure throughout the conduit pipes and branches. The several belt tighteners can be adjusted if desired, and such of the valves controlling the supply of tempering solution to the apparatus will be turned on as much as believed necessary, this supply being easily and constantly increased or decreased during the continuous operation of the machine, as the attendant may desire. A stack of soles being supplied to the feeding device, they are separated and fed forwardly into the throat 76, where the pair of belts seize the same and the first application of tempering solution is applied. The blank is then fed forwardly, being gripped on both sides firmly and flexed in alternate directions, while the tempering solution applied thereto quickly enters the pores as the blank is flexed and "worked". The blank then drops from the outlet 77 of the first pair of belts to the throat 78 of the second pair of belts, at which time it is again coated with solution and given a further and preferably sharper flexing bend. With the delivery mechanism attached as shown in Figs. 5 and 6, a blank 75 as it comes out of the machine is conveyed upwardly by the belt 160, the latter going at a sufficiently faster rate of speed to effect a separation of the blanks and the blank is then "snapped off" or thrown off against the plate 166, where they accumulate in a pile until removed by the operator. This delivery mechanism may be of any desired length and preferably brings the completely flexed and tempered blanks up to a desirable height or level, so that the operator can remove bunches of the same conveniently and rapidly. This delivery, also, has the friction members 170, which, by their weight, are sufficient to induce friction on the belt 160, so that the blanks 75 will be positively drawn out of the machine and fed upwardly with sufficient speed to afford the longitudinal separation of the blanks and to enable them to be "snapped off" or to "hop off" against the guide plate 166.

It will be appreciated that our present machine combines in a high degree conveying and flexing means, as well as conveying and tempering means, and also conveying, bending or flexing and tempering means, all operable continuously and simultaneously, together with a conveyor system comprising a plurality—three in number—of portions or sections, each operating at different speeds for the combined efficiency of the entire apparatus. Thus the feeding mechanism at the entrance of the machine, is operated at a relatively high speed and sufficient to automatically separate blanks from the stack, as well as to supply an oversupply of blanks into the main portion of the machine, thus giving a continuous feed of blanks, abutting end for end sufficient for the operation of the flexing and tempering portions at its desired capacity. While the feeding rolls 192 and 193 are rotated at a peripheral speed greater than the surface speed of the conveying belts 15 and 21 and, therefore, this construction tends to feed the blanks 25 faster than the conveying belts will take them, yet, as the material being worked on is leather and the feeding rolls 192 and 193 are smooth faced, it follows that the feeding rolls 192 and 193 will slip on the blanks 75 and thus have a relative movement with respect thereto until such times as the conveying belts feed forward the blanks 75 from between such rolls 192 and 193. The practical effect of this construction is, therefore, that there is the equivalent of a continuous strip of leather passing through the conveyor belts. In this particular machine the separating and feeding of blanks can be and is advantageously carried out by the conveyor system at one speed, the operation of the belts during the conveying and tempering applying action is carried through by the conveyor system at a different speed, preferably slower, while the delivery mechanism necessarily operates at a still different speed, viz, at greater feeding and delivering capacity than that of the flexing and tempering devices in order that the blanks may be longitudinally separated and stacked. Thus if the machine is operated so that the conveyor system comprising a plurality of separate conveying devices, running at varying speeds, will first feed in blanks practically in an abutting condition, so as to give the greatest capacity to the machine, then secondly, convey, undulate, flex and temper these blanks, moving the same at desired speed to permit the thorough and progressive bending of the blanks and simultaneously applying the tempering solution into said blanks, thus operating at its highest efficiency, and then the blanks are thus taken from their abutting end to end position and positively drawn out and separated by the delivery portion of the conveyor, the machine will be run at its maximum efficiency. The conveyor system for carrying out this feature is of importance, and constitutes an important device, permitting blanks to be operated upon, to be piled into one end of the machine and the completely operated upon blanks to be removed in piles from an adjacent position.

The machine is capable of great speed in operation, the wooden frame effectually constituting an enclosure for the tempering solution, belts and working parts, keeping the same free of dust and collecting the extra solution as it drops and flows from the belts and work downwardly into the tank 5, to be again forced upwardly and in circulation. The wooden framework largely eliminates vibration, affords great economy of construction, ease in assembling and facilitates the renewal and removal of the belts, as already explained.

The important feature of the machine consisting in receiving blanks in groups, preferably laminated groups, and arranged horizontally, in separating, feeding in, conveying through, the flexing and tempering operations with the blanks moving in longitudinal progression and then assembling, delivering and stacking the blanks again in a laminated group, preferably arranged horizontally, is believed to be a distinct novelty and it is desired to claim the same broadly.

While the machine is intended primarily to operate upon leather and preferably sole blanks, harness, or the like, it is suitable to operate also upon sheet material, fibre board, laminated sheets, and entire sides of skins, hides, and the like, the machine being capable of any size for handling the material to be treated.

Our invention is further described and defined in the form of claims as follows:

1. Apparatus of the kind described, adapted for flexing and tempering leather, comprising a framework consisting in a pair of wooden sides, constituting supporting and enclosing means, a plurality of rollers arranged in staggered relation and bearing in the wooden sides of said framework, a pair of belts adapted to be led over and around said rollers to afford alternate flexing action on the work, and yielding belt tightening means adapted to exert a uniform tension on said belts.

2. Apparatus of the kind described, adapted for flexing and tempering leather, comprising a framework consisting in a pair of wooden sides, constituting supporting and enclosing means, a plurality of rollers arranged in staggered relation and bearing in the wooden sides of said framework, a plurality of pairs of belts adapted to be led over and around said rollers to afford alternate flexing action on the work, and yielding belt tightening means adapted to exert a substantially uniform tension on predetermined belts.

3. Apparatus of the kind described, for tempering leather blanks, comprising a plurality of pairs of conveyor members, means to conform said members in the line of a sinuous path, means to feed leather blanks to said conveying members and means to supply liquid solution to said members and the work in adjusted quantities simultaneously.

4. A leather tempering machine of the kind described, having in combination a plurality of endless belts arranged in groups, means cooperating with said belts for deflecting a predetermined portion of them in opposite directions, means supplying tempering solution both to said belts and to the material operated upon and means applying a substantially uniform tension upon predetermined belts of said groups.

5. Leather tempering apparatus of the kind described, comprising a pair of wooden sides constituting both supporting and enclosing means, a plurality of rolls arranged to rotate between said sides, journal bearings for said rolls in said sides, a plurality of pairs of belts fitted around predetermined sets of rolls, and removable sections in said sides, to enable a belt to be removed edgewise from its rolls, said removable sections being substantially flush with the sides of the framework and supporting the rolls substantially throughout the thickness of said sides when the removable sections are in assembled position.

6. Leather tempering apparatus of the kind described, comprising a pair of wooden sides constituting both supporting and enclosing means, a plurality of rolls arranged to rotate between said sides, journal bearings for said rolls in said sides, a plurality of pairs of belts fitted around predetermined sets of rolls, and removable sections in said sides, to enable a belt to be removed edgewise from its rolls, said removable sections being substantially flush with the sides of the framework and supporting the rolls substantially throughout the thickness of said sides when the removable sections are in assembled position, and means to hold said sections in their assembled position.

7. A leather tempering machine of the kind described, having in combination a plurality of endless belts arranged in pairs, means cooperating with said belts for deflecting a predetermined portion of them in opposite directions, means supplying tempering solution both to said belts and to the material operated upon and means applying a substantially uniform tension upon predetermined belts of said pairs.

In testimony whereof, we have signed our names to this specification.

FRANK W. MERRICK.
WALLACE C. WRIGHT.